United States Patent Office 2,897,228
Patented July 28, 1959

2,897,228
ORGANO-PHOSPHORUS CONDENSATION PRODUCTS

Carleton B. Scott, Pomona, and William L. Wasley, Santa Ana, Calif., assignors to Union Oil Company of California, Los Angeles, Calif., a corporation of California No Drawing. Application August 3, 1956
Serial No. 602,074

15 Claims. (Cl. 260—461)

This invention relates to novel chemical products comprising organic phosphorus-containing compounds, and in particular relates to new condensation products obtained by reaction between certain alkyl trithiometaphosphates and olefinic hydrocarbons. As is hereinafter more fully described, these new products are useful as active ingredients in fungicidal compositions and as intermediates for the preparation of lubricating oil detergents.

The alkyl trithiometaphosphates which are employed in preparing the novel products of the invention are methyl trithiometaphosphate and ethyl trithiometaphosphate. These compounds are described and claimed in U.S. Patent No. 2,764,606, and are readily obtained by reaction between phosphorus pentasulfide and methyl or ethyl mercaptan, or by reaction between phosphorus-pentasulfide and trimethyl- or triethyl-tetrathiophosphate. The olefine reactant may be any hydrocarbon containing at least one ethylenic linkage, i.e., any compound of the general formula:

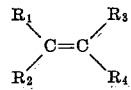

wherein $R_1$, $R_2$, $R_3$ and $R_4$ each represents hydrogen or a monovalent hydrocarbon radical, or two of said symbols together represent a divalent hydrocarbon radical. Examples of such olefinic compounds include ethylene, propylene, butylene, isobutylene, butadiene, isoprene, octene-2 di-isobutylene, dodecylene, tetradecylene, cetene, cyclohexene, methyl-cyclohexene, cyclopentene, dimethyl-cyclopentene, cyclohexadiene, styrene, diphenylethylene, vinyl-naphthalene, etc. The exact mechanism of the reaction and the molecular structure of the new products are not known with certainty; however, infrared absorption data and chemical analyses suggest the following:

wherein R represents methyl or ethyl, and "$m$" is an integer ranging from 1 to several thousand.

The reaction by which the new products are formed is carried out simply by heating a mixture of the two reactants at a reaction temperature between about 10° C. and about 250° C. until reaction is complete. The optimum reaction temperature within the given range depends primarily upon the reactivity of the olefine reactant. Conjugated diolefines, for example, are highly reactive and react with the metaphosphates at relatively low temperatures, e.g., 10°–50° C; long chain monoolefines, however, react only upon heating the reaction mixture to temperatures of 100°–250° C. Accordingly, in preparing the new products the temperature to which the reaction mixture is heated may vary between about 10° C. and about 250° C. depending upon the identity of the olefinic hydrocarbon reactant.

The reaction takes place readily at atmospheric pressure, but when the olefine reactant is one having a relatively high vapor pressure at the reaction temperature employed it is preferred to operate under increased pressure in order to maintain an adequate concentration of such reactant. Conveniently the reaction is effected under sufficient pressure to maintain the olefine reactant substantially in the liquid phase.

The time required for completion of the reaction is dependent upon the identity of the olefinic hydrocarbon reactant and the reaction temperature employed. When the reaction is carried out in a closed system under autogenic pressure, completion of the reaction is indicated by the pressure reaching a fixed low value; in an open system, completion of the reaction is indicated by exothermic heat of reaction no longer being evolved. Ordinarily, the reaction goes to completion in from about 0.5 to about 24 hours.

As is indicated by the reaction mechanism postulated above, the reactants combine in equimolecular proportions. However, in order to insure complete consumption of the trithiometaphosphate it is usually preferred to provide an excess of the olefinic hydrocarbon; upon completion of the reaction the unreacted olefine is removed by distillation, solvent extraction or other suitable means. Use of the trithiometaphosphate in excess of equimolecular proportions is not desirable since the unreacted trithiometaphosphate is not readily separated from the reaction product.

In accordance with conventional procedure, the reaction is preferably conducted in the presence of an inert liquid reaction medium, e.g., benzene, toluene, petroleum ether, diethyl ether, carbon tetrachloride, etc. The use of such a medium promotes intimate contact of the reactants, improves the transfer of heat to and from the reaction mixture, and renders the viscous reaction product more easily handled at ambient temperatures.

Upon completion of the reaction, the product is purified by separating therefrom the inert reaction medium and any unreacted olefine. Such separation is readily accomplished by distillation, vacuum stripping, solvent extraction, gas stripping, or any combination of the same.

The products prepared as described above vary from relatively viscous liquids to semi-solid resins. They are usually yellow in color, and are insoluble in water but soluble to varying extents in organic solvents such as benzene, ether, acetone, etc. They are very high-boiling, and can be distilled without decomposition only under the very high vacuum of a molecular still.

The following examples will illustrate the preparation of several of the products of the invention, but are not to be construed as limiting the same.

*Example I*

One-half mole of methyl trithiometaphosphate is dissolved in 150 ml. of benzene and placed in a pressure vessel. Propylene is then introduced into the vessel until the pressure therein reaches 85 p.s.i.g. The vessel and contents are then heated at 80°–90° C. for 19 hours with propylene being added to maintain the stated pressure. The vessel is then cooled, opened, and the reaction product is removed. The latter is filtered to remove a small amount of unidentified solid material (possibly a high molecular weight polymer or condensation product), after which it is heated at about 40° C. under 1 mm. pressure to remove the benzene and other volatiles. The resulting product is a viscous yellow liquid, soluble in acetone, benzene, and carbon tetrachloride.

*Example II*

One-quarter mole of methyl-trithiometaphosphate is dissolved in 100 ml. of benzene, and gaseous butadiene is bubbled through the resulting solution for 20 minutes while cooling the solution to maintain a temperature of about 70°–80° C. The reaction product is then cooled to about 22° C. and is allowed to stand in the presence of excess butadiene for about 2 hours. The product is then heated at about 40° C. under 1 mm. pressure until all of the benzene and unreacted butadiene has been evaporated. The resulting product is a viscous yellow liquid whose infrared spectrum indicates it to have the structure

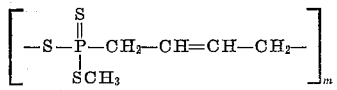

*Example III*

One-half mole of methyl trithiometaphosphate is dissolved in 300 ml. of benzene. One-half mole of cyclopentadiene is then added gradually to the benzene solution over a period of about 30 minutes, during which time the temperature of the reaction mixture rises to about 60° C. After vacuum stripping to remove the benzene, the product is obtained as a yellow viscous oil whose infrared spectrum indicates it to have the structure

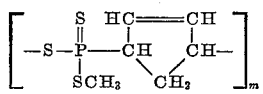

*Example IV*

One hundred parts of an isoprene-isobutylene copolymer (1.5:98.5) are dispersed in 400 parts of a neutral hydrocarbon oil, and 4.2 parts of methyl trithiometaphosphate are added to the dispersion. The mixture is heated at 170–175° C. for two hours in an atmosphere of nitrogen, and is then cooled to 140° C. Ten parts of crystalline hydrated barium hydroxide is then added gradually over a period of one-half hour. A lubricating oil composition containing 5 percent of the barium derivative so prepared had a Lauson detergency rating of 79, as compared with a value of 50 for the base oil wthout the additive.

The foregoing Example IV illustrates the use of one of the new products as an intermediate in the preparation of a detergent additive for lubricating oils. These products are also useful as the active ingredients of fungicidal compositions. In simplest form, such compositions consist of an inert solid or liquid carrier material having dispersed therein an effective amount, e.g., 0.001–0.01 percent by weight of the active ingredient. Conventionally, such compositions also comprise a dispersing or emulsifying agent adapted to maintain the active ingredient uniformly dispersed or suspended in an inert liquid vehicle. The following table sets forth the results obtained by subjecting the products of Examples I, II and III to standard testing procedure on a variety of test fungi. The test compositions consisted of 0.001 percent by weight dispersion of the active ingredient in water, uniform dispersion being maintained by the use of a non-ionic organic dispersing agent.

| Test Organism | Percent Control | | |
| --- | --- | --- | --- |
| | Example I | Example II | Example III |
| R. solani | 89.0 | 94.5 | 100.0 |
| S. rolfsii | 96.0 | 100.0 | 100.0 |
| P. cinnamomi | 100.0 | 100.0 | 100.0 |
| P. ultimum | 100.0 | 100.0 | 100.0 |
| S. sclerotiorum | 89.0 | 100.0 | 98.2 |
| S. fructicola | 96.7 | 93.3 | 100.0 |
| B. cinerea | 89.0 | 79.8 | 96.9 |
| A. solani | 73.2 | 66.7 | 55.6 |
| Average | 91.6 | 91.8 | 93.8 |

Other modes of applying the principle of our invention may be employed instead of those explained, change being made as regards the methods or materials employed provided the products stated by any of the following claims, or the equivalent of such stated products, be obtained.

We, therefore, particularly point out and distinctly claim as our invention:

1. A phosphorus-containing organic product obtained by reacting an alkyl trithiometaphosphate selected from the class consisting of methyl trithiometaphosphate and ethyl trithiometaphosphate with a hydrocarbon selected from the class consisting of (1) hydrocarbons containing at least one but not more than two ethylenic double bonds contained in an aliphatic chain containing from 2 to 16 carbon atoms, (2) hydrocarbons containing at least one but not more than two ethylenic double bonds contained in a 5- to 6-carbon atom cycloaliphatic ring, and (3) copolymers of isoprene and butadiene, said reaction being carried out at a temperature between about 10° and about 250° C. and under sufficient pressure to maintain said reactants substantially in the liquid phase, said reactants being contained in said product in substantially equimolecular proportions.

2. A product as defined by claim 1 wherein the said hydrocarbon is an aliphatic mono-olefine.

3. A product as defined by claim 1 wherein the said hydrocarbon is a diolefine.

4. A product as defined by claim 1 wherein the said alkyl trithiometaphosphate reactant is methyl trithiometaphosphate.

5. A product as defined by claim 1 wherein the said alkyl trithiometaphosphate reactant is methyl trithiometaphosphate and the said hydrocarbon reactant is an aliphatic mono-olefine.

6. A product as defined by claim 1 wherein the said alkyl trithiometaphosphate reactant is methyl trithiometaphosphate and the said hydrocarbon reactant is an aliphatic diolefine.

7. A product as defined by claim 1 wherein the said alkyl trithiometaphosphate reactant is methyl trithiometaphosphate and the said hydrocarbon reactant is ethylene.

8. A product as defined by claim 1 wherein the said alkyl trithiometaphosphate reactant is methyl trithiometaphosphate and the said hydrocarbon reactant is butadiene.

9. A product as defined by claim 1 wherein the said alkyl trithiometaphosphate reactant is methyl trithiometaphosphate and the said hydrocarbon reactant is cyclopentadiene.

10. The process which comprises heating an alkyl trithiometaphosphate selected from the class consisting of methyl trithiometaphosphate and ethyl trithiometaphosphate with at least about one molecular equivalent of a hydrocarbon selected from the class consisting of hydrocarbons containing at least one but not more than two ethylene double bonds contained in an aliphatic chain containing from 2 to 16 carbon atoms, hydrocarbons containing at least one but not more than two ethylenic bonds contained in a 5- to 6-carbon atom cycloaliphatic ring, and copolymers of isoprene and butadiene at a temperature between about 10° and about 250° C. and under sufficient pressure to maintain said reactants substantially in the liquid phase.

11. The process of claim 10 wherein said heating is carried out in the presence of an inert liquid reaction medium.

12. The process of claim 10 wherein the said alkyl trithiometaphosphate reactant is methyl trithiometaphosphate.

13. The process of claim 12 wherein the said hydrocarbon reactant is an aliphatic hydrocarbon.

14. A product as defined by claim 1 wherein the said alkyl trithiometaphosphate reactant is methyl trithiometaphosphate and the said hydrocarbon reactant is a copolymer of isoprene and butadiene.

15. The process of claim 12 wherein the said hydrocarbon is a copolymer of isoprene and butadiene.

References Cited in the file of this patent

FOREIGN PATENTS 988,962     France    ---------------- Sept. 3, 1951